US 7,860,161 B2

(12) United States Patent
Xu et al.

(10) Patent No.: US 7,860,161 B2
(45) Date of Patent: *Dec. 28, 2010

(54) ENHANCEMENT LAYER TRANSCODING OF FINE-GRANULAR SCALABLE VIDEO BITSTREAMS

(75) Inventors: Jizheng Xu, Beijing (CN); Feng Wu, Beijing (CN); Shipeng Li, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 1589 days.

This patent is subject to a terminal disclaimer.

(21) Appl. No.: 10/736,955

(22) Filed: Dec. 15, 2003

(65) Prior Publication Data
US 2005/0129123 A1    Jun. 16, 2005

(51) Int. Cl.
H04N 7/12 (2006.01)
H04N 7/28 (2006.01)
H04N 7/01 (2006.01)
H04N 7/50 (2006.01)

(52) U.S. Cl. ............. 375/240.11; 375/240; 375/240.16; 375/240.25; 375/240.26

(58) Field of Classification Search .................. 375/240, 375/240.26; 709/219, 231–234; 725/92–96
See application file for complete search history.

(56) References Cited

U.S. PATENT DOCUMENTS

| | | | | |
|---|---|---|---|---|
| 5,687,095 A | * | 11/1997 | Haskell et al. | 348/386.1 |
| 5,742,343 A | * | 4/1998 | Haskell et al. | 375/240.15 |
| 5,802,226 A | * | 9/1998 | Dischert et al. | 386/53 |
| 5,903,673 A | * | 5/1999 | Wang et al. | 382/236 |
| 5,953,506 A | * | 9/1999 | Kalra et al. | 709/231 |
| 6,014,693 A | * | 1/2000 | Ito et al. | 709/219 |
| 6,208,688 B1 | | 3/2001 | Seo et al. | |
| 6,337,881 B1 | * | 1/2002 | Chaddha | 375/240.16 |
| 6,339,450 B1 | | 1/2002 | Chang et al. | |
| 6,345,279 B1 | * | 2/2002 | Li et al. | 707/104.1 |
| 6,407,680 B1 | * | 6/2002 | Lai et al. | 341/50 |
| 6,434,197 B1 | * | 8/2002 | Wang et al. | 375/240.29 |
| 6,434,746 B1 | * | 8/2002 | Nagashima et al. | 725/5 |
| 6,477,706 B1 | * | 11/2002 | Hua et al. | 725/96 |

(Continued)

OTHER PUBLICATIONS

Chaddha, N. et al. "An End to End Software Only Scalable Video Delivery System", ACM Proc. of the Fifth Int'l. Workshop on Network and OS Support for Digital Audio and Video (NOSDAV '95), Apr. 1995, pp. 130-141.*

(Continued)

Primary Examiner—Mehrdad Dastouri
Assistant Examiner—David N Werner
(74) Attorney, Agent, or Firm—Lee & Hayes, PLLC

(57) ABSTRACT

Systems and methods for enhancement layer transcoding of fine-granular scalable video bitstreams are described. In one aspect, an enhancement layer bitstream is decoded from encoded video data. The encoded video data includes a base layer and one or more enhancement layers. The encoded video data is encoded according to a high HQRB (high quality reference bit-rate). Data throughput characteristics of a network coupled to a client computing device are determined. A new HQRB is calculated based on the data throughput characteristics. The decoded enhancement layer bitstream is then encoded based on the new HQRB to generate a transcoded enhancement layer for streaming to the client computing device. The base layer is not decoded for streaming to the client computing device.

36 Claims, 6 Drawing Sheets

U.S. PATENT DOCUMENTS

| | | | |
|---|---|---|---|
| 6,480,547 B1 * | 11/2002 | Chen et al. | 375/240.27 |
| 6,526,099 B1 * | 2/2003 | Christopoulos et al. | 375/240.26 |
| 6,564,262 B1 * | 5/2003 | Chaddha | 709/231 |
| 6,700,933 B1 * | 3/2004 | Wu et al. | 375/240.16 |
| 6,798,838 B1 * | 9/2004 | Ngo | 375/240.19 |
| 6,909,753 B2 | 6/2005 | Meehan et al. | |
| 6,925,120 B2 | 8/2005 | Zhang et al. | |
| 7,003,034 B2 * | 2/2006 | Roh | 375/240.11 |
| 7,058,122 B2 | 6/2006 | Brown et al. | |
| 7,072,394 B2 | 7/2006 | Huang et al. | |
| 7,099,954 B2 * | 8/2006 | Li et al. | 709/233 |
| 2001/0043744 A1 * | 11/2001 | Hieda | 382/232 |
| 2002/0094025 A1 * | 7/2002 | Hanamura et al. | 375/240.01 |
| 2002/0116715 A1 * | 8/2002 | Apostolopoulos | 725/86 |
| 2002/0118743 A1 * | 8/2002 | Jiang | 375/240.01 |
| 2003/0002579 A1 * | 1/2003 | Radha et al. | 375/240.1 |
| 2003/0058931 A1 * | 3/2003 | Zhang et al. | 375/240.01 |
| 2003/0128764 A1 * | 7/2003 | Barrau et al. | 375/240.25 |
| 2003/0142744 A1 | 7/2003 | Wu et al. | |
| 2003/0236904 A1 | 12/2003 | Walpole et al. | |
| 2005/0129123 A1 * | 6/2005 | Xu et al. | 375/240.16 |
| 2006/0133475 A1 * | 6/2006 | Bruls et al. | 375/240.1 |

OTHER PUBLICATIONS

Wu, F. et al. "A Framework for Efficient Progressive Fine Granularity Scalable Video Coding", IEEE Trans. on Circuits and Systems for Video Technology, Mar. 2001, vol. 11, No. 3, pp. 332-344.*

Chawathe, Y. et al. "RMX: Reliable Multicast for Heterogenous Networks", Proc. IEEE INFOCOM, Mar. 2000, pp. 795-804.*

Horn, U. et al. "Robust Internet Video Transmission Based on Scalable Coding and Unequal Error Protection", Image Communication, Sep. 1999, vol. 15, No. 1, pp. 77-94.*

Horn, U. et al. "Scalable Video Transmission for the Internet", _Computer Networks and ISDN Systems_, Nov. 1997, vol. 29, No. 15, pp. 1833-1842.*

Margaritidits, M. et al. "Adaptation Techniques for Ubiquitous Internet Multimedia", _Wireless Communications and Mobile Computing_, 2001, vol. 1, No. 2, pp. 141-164.*

Tudor, P. N. "Tutorial MPEG-2 Video Compression", IEE Electronics and Communication Engineering Journal, Dec. 1995, pp. 257-264.*

Wu, F. et al. Progressive Fine Granular Scalable (PFGS) Video Using Advance-Predicted Bitplane Coding (APBIC), Proc. of 2001 IEEE Int'l Symposium on Circuits and Systems (ISCAS 2001), May 2001, vol. 5, pp. 97-100.*

Floyd, S., Fall, K., "Promoting the use of end-to-end congestion control in the Internet", IEEE trans. on Network, vol. 7, 458-472, 1999.

Handley, M., Pahdye, J., Floyd, S., TCP friendly rate control (TFRC): Protocol specification, IETF Internet draft, draft-ietf-tsvwg-tfrc-02, May 2001.

He, Y., et al., "H.26L-based fine granularity scalable video coding", ISCAS 2002, Scottsdale, Arizona, May 26-29, 2002.

Huang, H.C., Wang, C.N., Hao, T., "A robust fine granularity scalability using trellis-based predictive leak", IEEE Trans. on CSVT, Jun. 2002.

Peng, et al., "Mode-Adaptive Fine Granularity Scalability", in Proc. of IEEE ICIP, vol. 2, pp. 993-996, Oct. 2001.

* cited by examiner

US 7,860,161 B2

ENHANCEMENT LAYER TRANSCODING OF FINE-GRANULAR SCALABLE VIDEO BITSTREAMS

TECHNICAL FIELD

The systems and methods of the invention pertain to encoding and decoding video data.

BACKGROUND

Bandwidth adaptation makes scalable video coding an elegant solution for video streaming over Internet and wireless networks, especially since available channel bandwidth can frequently and unpredictably change in such network environments. However, wide range bandwidth adaptation also means that scalable video coding can not work efficiently at all bit-rates. For example, when a scalable video encoder is set to optimize coding performance at a low bit-rate, performance at high bit-rates is typically sacrificed. Moreover, when a video encoder is set to optimize coding performance at a high bit-rate, encoder performance at low bit rates is generally poor. Such phenomenon substantially limits the efficiency of scalable video streaming over heterogeneous networks such as the Internet. This is because the bandwidth of each sub-network can be very different.

SUMMARY

Systems and methods for enhancement layer transcoding of fine-granular scalable video bitstreams are described. In one aspect, an enhancement layer bitstream is decoded from encoded video data. The encoded video data includes a base layer and one or more enhancement layers that have been encoded according to a high HQRB (high quality reference bit-rate). The decoded enhancement layer bitstream is then encoded based on a new HQRB to generate a transcoded enhancement layer for streaming to the client computing device. The new HQRB is calculated based on the data throughput characteristics of a network coupled to a client computing device. The base layer is not decoded for streaming to the client computing device.

BRIEF DESCRIPTION OF THE DRAWINGS

In the figures, the left-most digit of a component reference number identifies the particular figure in which the component first appears.

DETAILED DESCRIPTION

Overview

Figure 1:
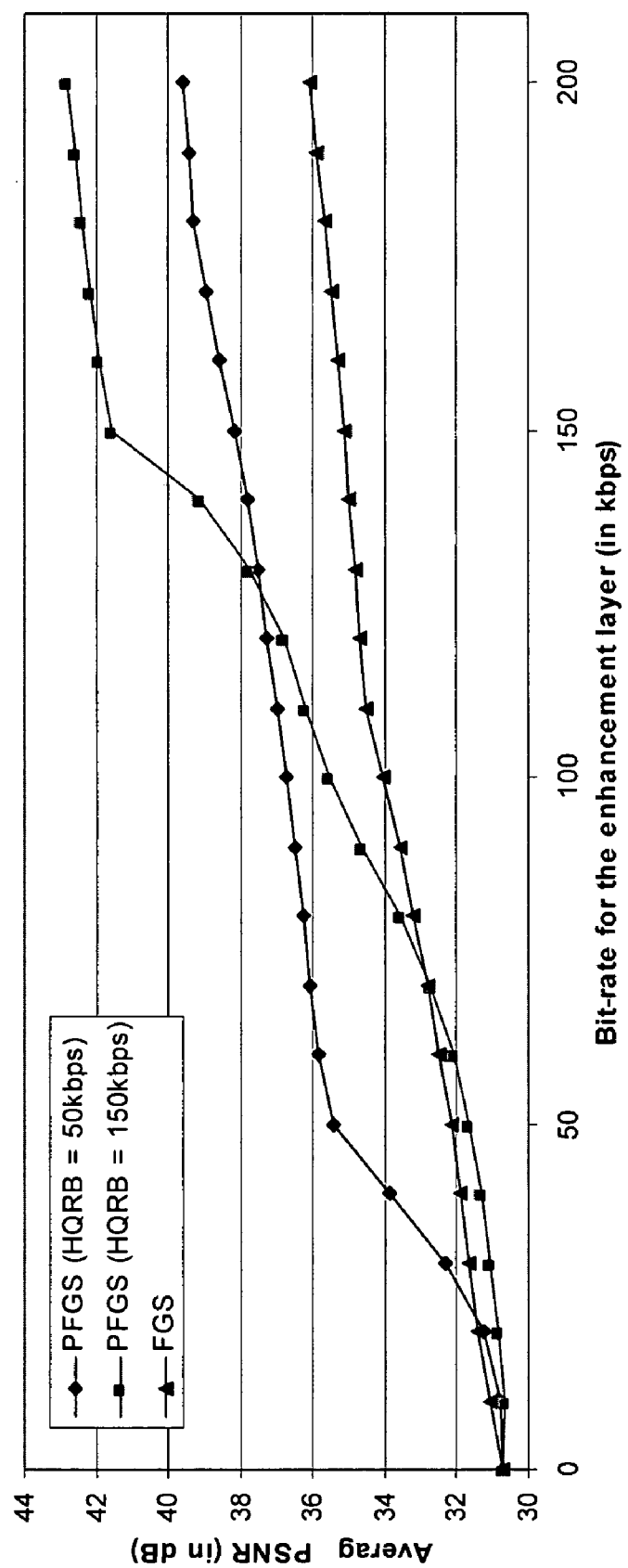
FIG. 1 is a block diagram that compares coding performance of two Progressive Fine-Granularity Scalable (PFGS) enhancement bitstreams, both of which have the same base layer.

FIG. 1 is a block diagram that compares coding performance of two Progressive Fine-Granularity Scalable (PFGS) enhancement bitstreams, both of which have the same base layer. PFGS is a known encoding scheme that employs progressive fine-granularity layered coding to encode video data frames into multiple layers, including a base layer of comparatively low quality video and multiple enhancement layers of increasingly higher quality video. These multiple layers are used to construct two reference images for each frame, one is the reconstruction image of the base layer, and the other is high quality reference image that is reconstructed using the base layer bitstream and a part of the enhancement layer bitstream. A parameter, high quality reference bit-rate (HQRB) determines how many bits of the enhancement layer bitstream are used to reconstruct the high quality reference image.

FIG. 1 shows that a high HQRB value (150 kbps) allows the PFGS bitstream to perform well at high bit-rates since the qualities of the high quality reference images are improved. For such a PFGS bitstream, high channel bandwidth may be expected so that the high quality reference images are able to be transmitted to the decoder in most cases. However, a high HQRB value would cause drifting errors at low data throughput bit-rate. FIG. 1 further shows that at low bit-rates, the PFGS bitstream with a low HQRB value works better. So when bandwidth changes dramatically, neither bitstream works well. This dilemma exists not only with respect to PFGS, but it is also present with respect to many other scalable video coding schemes such as Robust FGS (RFGS) [1], and Mode Adapted FGS (MA-FGS) [2] that utilize enhancement layer's information to assist the performance of image prediction. As noted above, such phenomenon substantially limits the efficiency of scalable video streaming over heterogeneous networks such as the Internet.

To address this limitation, the following described systems and methods improve scalable video streaming performance over heterogeneous networks. In particular, the following systems and methods transcode enhancement layer bitstream portions of fine-granularity scalable (FGC) encoded video as a function of sub-network bit-rates/bandwidth and/or other criteria which may affect the efficiency of encoded video data transfer between two computing devices. This allows the FGS transcoded video to be generated and communicated to a requesting client device over one or more sub-networks at substantially optimal bit-rates (ranges). In this implementation, an encoding module generates an FGS bitstream from raw input data with high HQRB value. The FGS bitstream is stored on a server for subsequent streaming to a client device (e.g., for decoding and playback at the client).

Responsive to a client request for the FGS bitstream (or responsive to some other indication that the FGS bitstream is to be communicated to a client device by a server), The FGS bitstream per se is not streamed to the client. Instead, an enhancement layer transcoding module transcodes the enhancement layer bitstream of the FGS bitstream based on a new HQRB value that is determined as a function of current network data throughput conditions and/or current client device capabilities. Without decoding or otherwise modifying the corresponding base layer bitstream, which provides low complexity of operation, the transcoder extracts motion vectors from the base layer to transcode the enhancement layer with this new HQRB value. The encoded base layer and the transcoded enhancement layer bitstream(s) is then communicated to the requesting client with substantially optimal encoding in view of the network conditions and/or client capabilities. This low-complexity transcoding is substantially beneficial in real-time streaming environment where a video content server may simultaneously support multiple users over diverse and substantially unpredictable network conditions.

These and other aspects of the systems and methods for enhancement layer transcoding to improve scalable video coding streaming performance are now described in greater detail.

Exemplary Video Distribution System

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

Figure 2:
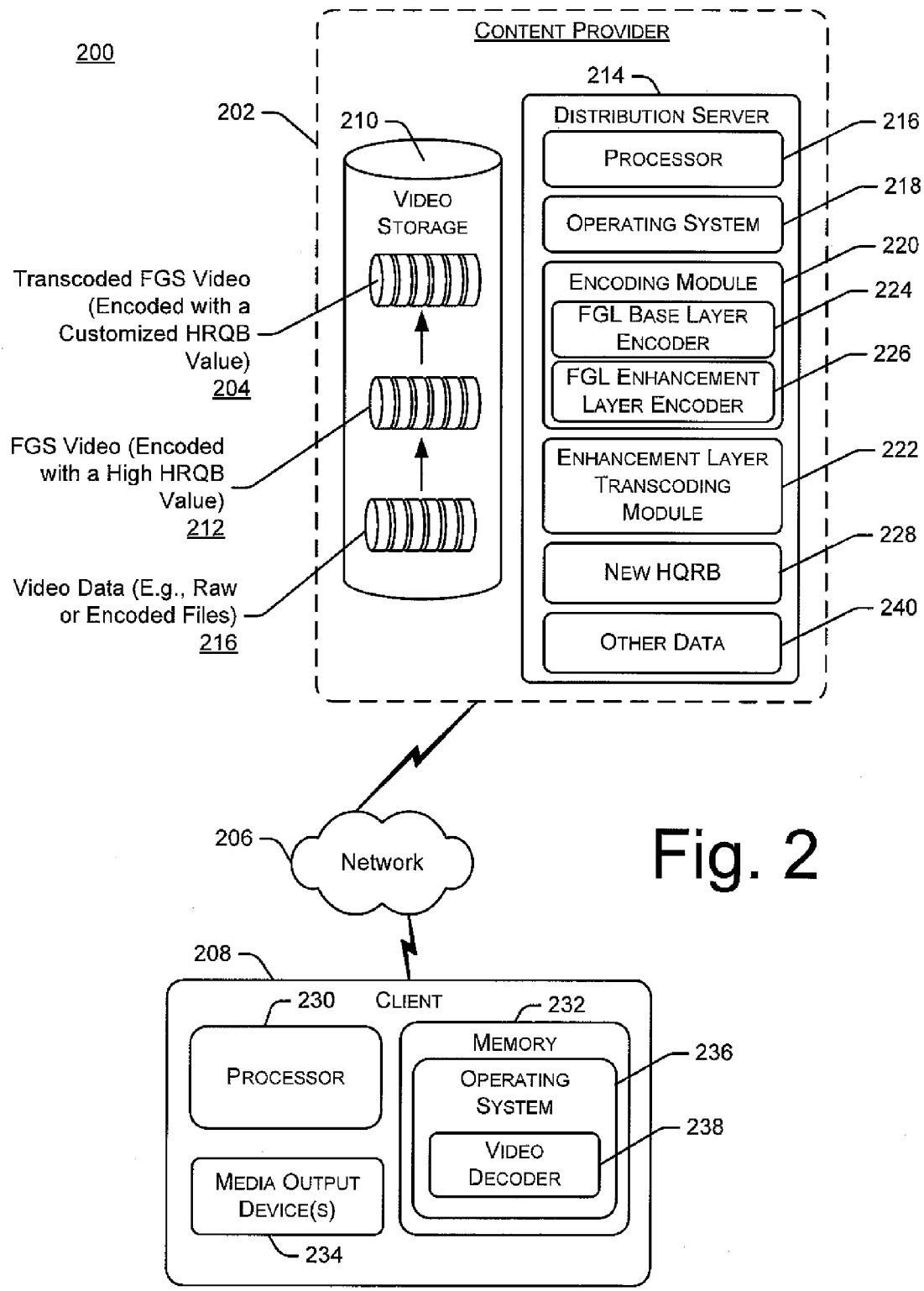
FIG. 2 shows a video distribution system in which a content producer/provider produces and streams enhancement layer transcoded Fine-Granular-Scalable (FGS) video data over a network to a client computing device.

FIG. 2 shows a video distribution system 200 in which content producer/provider 202 produces and streams enhancement layer transcoded FGS video data (i.e., Transcoded FGS Video 204) over a network 206 to a client 208. The network is representative of many different types of networks, including the Internet, a LAN (local area network), a WAN (wide area network), a SAN (storage area network), wireless networks (e.g., satellite, cellular, RF, etc.), and so on. The content producer/provider 202 has video storage 210 to store FGS video 212, and one or more distribution servers 214 to decode/encode (i.e., transcode) at least a subset of the FGS video into transcoded FGS Video 204 for distribution over the network 206.

In one implementation, FGS video 212 is not generated by distribution server 214, but rather only stored on the distribution server for subsequent transcoding and distribution to a client 208 as transcoded FGS video 204. (Hereinafter, the distribution server is often simply referred to as the "server"). In another implementation, the server generates FGS video 212 from one or more video files 216 using well-known video encoding techniques such as PFGS, MA-FGS, RFGS, and/or the like encoding techniques). Independent of how the FGS video 212 is obtained by the server 214, the FGS video 212 is encoded with a high HRGB value.

Server 214 includes processor 216, operating system 218, encoding module 220, and enhancement layer transcoding module 222. For purposes of discussion, this implementation for enhancement layer transcoding of FGS bitstreams to increase the efficiency of scalable video encoding and communication and/or utilization to/by one or more client devices, uses encoding module 220 to generate the FGS video 212. In the implementation where the server does not generate the FGS video 212, the encoding module 220 is optionally present. The encoding module 220 (encoder) and the video transcoder 222 (transcoder) may be implemented in software, firmware, and/or hardware. The encoder and the transcoder are shown as separate standalone modules in the same computing device for discussion purposes, but may be constructed as part of the processor 216, incorporated into operating system 218, incorporated into other applications (not shown), and/or resident in different computing devices coupled to the network 206.

Encoding module 220 encodes video data 212 using a motion-compensation-based coding scheme. More specifically, the encoder 220 employs a fine-granularity scalable (FGS) layered coding scheme to encode the video data to produce FGS video 212 with a high HQRB value. In this implementation, the H.26L-based PFGS encoding scheme is used by the encoding module to generate the FGS video 212, although in other implementations, other video file encoding schemes such RFGS, MA-FGS, etc., could be utilized to produce FGS video 212.

FGS video 212 comprises a base layer and one or more enhancement layers. "Fine-granularity" (FG) encoding means that the difference between any two layers, even if small, can be used by a decoder to improve the image quallity. Fine-granularity layered video coding makes sure that the prediction of a next video frame from a lower layer of the current video frame is good enough to keep the efficiency of the overall video coding. To these ends, the encoding module 220 has a base layer encoding component 224 to encode the video data into the base layer and an enhancement layer encoding component 226 to encode the video data into one or more enhancement layers.

When an FGS bitstream (a FGS video file 212) is to be communicated to a client device 208 by the server 214 (e.g., responsive to a client request), rather than streaming the FGS bitstream to the client, the enhancement layer transcoding module 222 decodes the enhancement layer bitstream of the FGS video based on a new HQRB value 228. The transcoding module 222 calculates the new HQRB as a function of current network data throughput conditions between the server and the client device, and/or current client device capabilities. (Techniques for determining current network data throughput conditions and client networking and video presentation capabilities are known).

Typically, channel bandwidth estimation techniques are divided into two categories: probe-based and model-based. The probe-based techniques estimate the channel bandwidth bottleneck by adjusting the sending rate in a way that could maintain packet loss ratio below a certain threshold (D. Wu, Y. T. Hou, W. Zhu, H.-J. Lee, T. Chiang, Y.-Q. Zhang, H. J. Chao, On end-to-end architecture for transporting MPEG-4 video over the Internet, IEEE trans. on CSVT, vol. 10, 923-941, 2000). The model-based techniques are based on a TCP throughput model that explicitly estimates the sending rate as a function of recent packet loss ratio and latency. Specifically, the TCP throughput model is given by the following formula (S. Floyd, K. Fall, Promoting the use of end-to-end congestion control in the Internet, IEEE trans. on Network, vol. 7, 458-472, 1999):

$$\lambda = \frac{1.22 \times MTU}{RTT \times \sqrt{p}} \quad (1)$$

wherein, $\lambda$ represents throughput of a TCP connection (in bytes/s), MTU represents packet size used by the connection (in bytes), RTT represents round-trip time of the connection (in seconds), and p represents packet loss ratio of the connection. With this formula, a server can estimate the available bandwidth by receiving feedback parameters RTT and p from the client.

Among existing model-based approaches, TCP-friendly Rate Control (TFRC) (M. Handley, J. Pahdye, S. Floyd, TCP friendly rate control (TFRC): Protocol specification, IETF Internet draft, draft-ietf-tsvwg-tfrc-02, May 2001) is the most deployable and successful one. The sending rate formula by considering the influence of time out is given as follows:

$$\lambda = \frac{MTU}{RTT\sqrt{\frac{2p}{3}} + RTO\left(3\sqrt{\frac{3p}{8}}\right)p(1+32p^2)},$$

wherein RTO represents the TCP retransmission time out value (in seconds).

In this implementation for enhancement layer transcoding of fine-granular scalable video bitstreams, estimated bandwidth is first used to deliver the base layer to the client. Calculated HQRB will represent a substantially similar, and generally not greater than bandwidth used to deliver the base layer. The HQRB may be determined by the client computing device. For example, a non-pc device may only allow to real-time decode the received data under certain a bit rate. In such a scenario, the HQRB is close to but not more than the difference between the bit rate and the base layer bit rate.

Without decoding or otherwise modifying corresponding base layer bitstream (i.e., with low complexity of operation), the transcoder extracts motion vectors from the base layer to transcode the enhancement layer with this new HQRB value. The encoded base layer and the transcoded enhancement layer bitstream(s), which are collectively shown as transcoded FGS video 204, are then streamed to the requesting client.

The client 208 is equipped with a processor 230, a memory 232, and one or more media output devices 234. The memory 232 stores an operating system 236 that executes on the processor 230. The operating system 236 implements a client-side video decoder 238 to decode the layered video streams (i.e., transcoded FGS video 204) for presentation by the client device. In the event data is lost, the decoder 238 is capable of reconstructing the missing portions of the video from frames that are successfully transferred. Following decoding, the client plays the video via the media output devices 238. The client 208 may be embodied in many different ways, including a computer, a handheld entertainment device, a set-top box, a television, and so forth.

Exemplary Transcoding Scheme

Figure 3:
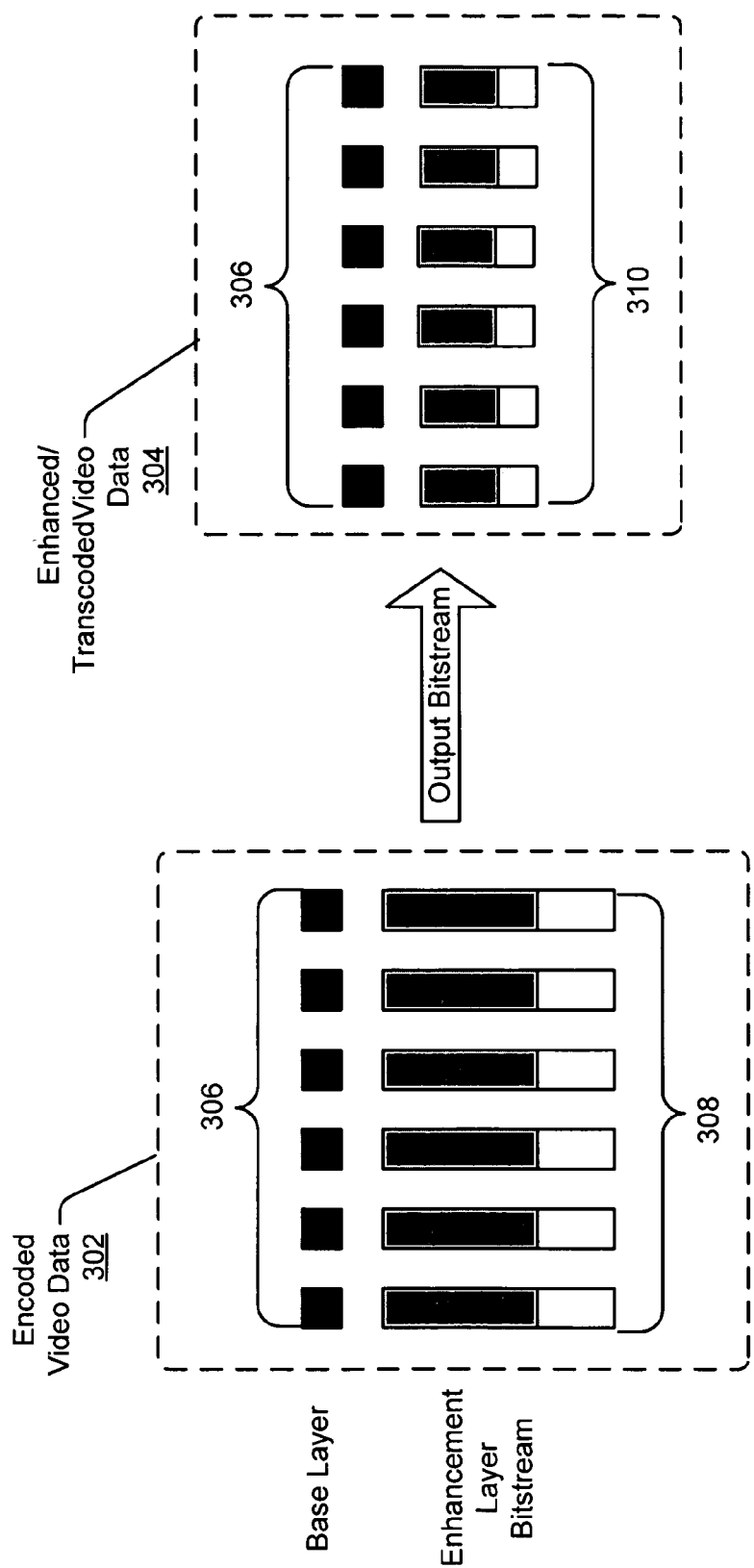
FIG. 3 conceptually illustrates a PFGS encoding scheme implemented by a video encoding module of FIG. 2, and an enhancement layer transcoding scheme implemented by an enhancement layer transcoding module of FIG. 2.

FIG. 3, conceptually illustrates a PFGS encoding scheme 302 implemented by the video encoding module 220 of FIG. 2, and an enhancement layer transcoding scheme 304 implemented by the enhancement layer transcoding module 222 of FIG. 2. (In the figures, the left-most digit of a component reference number identifies the particular figure in which the component first appears). As noted above, and in this implementation, encoding module 220 encodes video data 216 into one or more enhancement layers and a base layer using PFGS to generate FGS video 212 (other FGS encoding techniques could have been used). Data block 302 is representative of FGS video 212. Block 304 represents enhancement layer transcoding module 222 generated transcoded video data 204.

The black boxes 306 of FIG. 3 represent each respective encoding scheme's base layer and the rectangular boxes 308 and 310 indicate each respective encoding scheme's enhancement layer. The gray regions in the enhancement layer are bits for generation of the high quality reference image. As indicted by the output bitstream directional arrow of FIG. 3, when a high HQRB value PFGS bitstream 302 passes through a high bandwidth network to a low bandwidth network, the enhancement layer transcoding module 222 can improve the performance in the low bandwidth network by modifying the high HQRB enhancement bitstream 308 into a low HQRB enhancement bitstream 310, as included in the enhanced/transcoded video data 304.

In contrast to conventional techniques, wherein the enhancement layer of encoded video data cannot be modified without decoding the corresponding base layer 306, the base layer's bitstream from encoding scheme 302 to encoding scheme 304 is not changed and can pass directly to the client computing device 208. Note that in this example, base layer 306 in encoded block 306 is the same as the base layer 306 in transcoded block 304. Keeping the base layer's bitstream unchanged maintains architectural simplicity and efficiency for low complexity implementations of the enhancement layer transcoding module 222. Moreover, by not changing the base layer bitstream, any potential for base layer quality loss when transcoding is completely avoided.

Referring to FIG. 2, the enhancement layer transcoding module 222 does not decode the base layer when changing the FGS video 212 bitstream's HRQB value because base layer signals are always subtracted from enhancement layer signals and are not relative to the HQRB value. Suppose that an n-frame video sequence is coded using PFGS. Except for the first frame coded as I-frame, all other frames are coded as P-frame. Let $b_1, b_2, \ldots, b_n$ denote the base layer's signal coded for each frame. $E_1, E_2, \ldots, E_n$ and $e_1, e_2, \ldots, e_n$ denote the reconstructed images and residue images decoded from the input bitstream (FGS video 212). And let $E_1^1, E_2^1, \ldots, E_n^1$ and $e_1^1, e_2^1, \ldots, e_n^1$ stand for the input bitstream's high quality reference images and residue images referred by other frames. Correspondingly, $E_1^2, E_2^2, \ldots, E_n^2$ and $e_1^2, e_2^2, \ldots, e_n^2$ stand for the output bitstream's high quality reference images and residue images referred by other frames. In PFGS, there are:

$$E_i = MC(E_{i-1}^1) + b_i + e_i \quad (1),$$

$$E_i^1 = MC(E_{i-1}^1) + b_i + e_i^1 \quad (2)$$

$$E_i^2 = MC(E_{i-1}^2) + b_i + e_i^2 \quad (3), \text{ and}$$

wherein MC( ) represents a motion compensation operation.

The enhancement layer transcoding module 222 for PFGS video data input (e.g., please see encoded video data 302 of FIG. 3 changes the high quality reference from $E_1^1, E_2^1, \ldots, E_n^1$ to $E_1^2, E_2^2, \ldots, E_n^2$ and generates the new enhancement layer bitstream (e.g., see bitstream 304 of FIG. 3). The best images can be decoded from the input bitstream are $E_1, E_2, \ldots, E_n$. So using a new high quality reference 228, the signal to be coded is:

$$\begin{aligned} E_i - MC(E_{i-1}^2) - b_i &\quad (4) \\ &= MC(E_{i-1}^1) + b_i + e_i - MC(E_{i-1}^2) - b_i \\ &= MC(E_{i-1}^1 - E_{i-1}^2) + e_i. \end{aligned}$$

And $(E_i^1 - E_i^2)$ can be updated by:

$$\begin{aligned} E_i^1 - E_i^2 &= MC(E_{i-1}^1) + b_i + e_i^1 - MC(E_{i-1}^2) - b_i - e_i^2 \quad (5) \\ &= MC(E_{i-1}^1 - E_{i-1}^2) + (e_i^1 - e_i^2). \end{aligned}$$

Accordingly, the enhancement layer transcoding module 222 does not decode base layer $b_1, b_2, \ldots, b_n$, information to modify enhancement layer information.

Exemplary Transcoder

Figure 4:
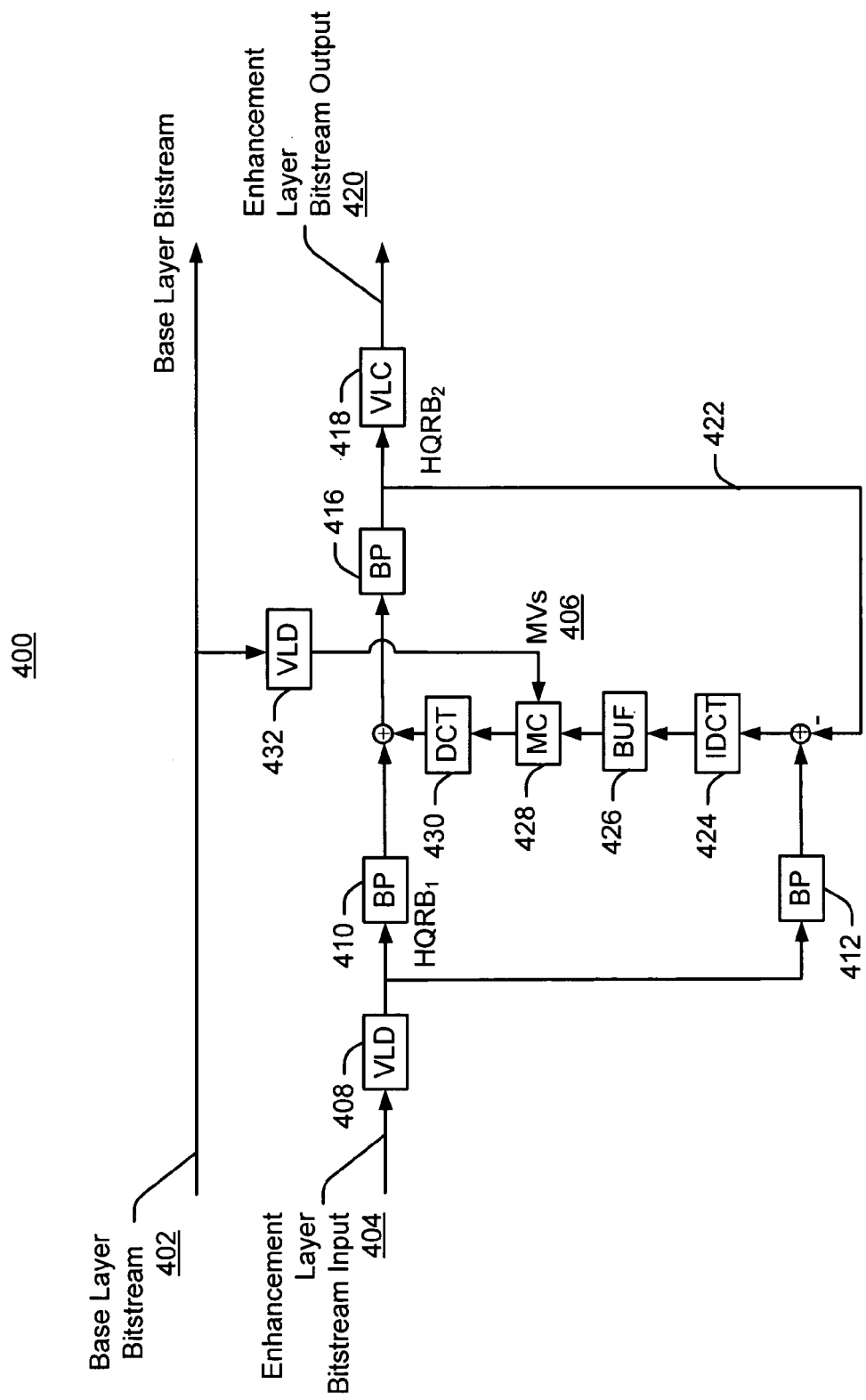
FIG. 4 is a block diagram of an exemplary architecture for an enhancement layer transcoding module of FIG. 2.

FIG. 4 is a block diagram of an exemplary architecture 400 for an enhancement layer transcoding module 222 of FIG. 2. (In the following discussion, the left-most digit of a component reference number identifies the particular figure in which the component first appears). As described below, enhancement layer bitstream transcoding architecture 400 illustrates a loop to maintain the difference signals between the input bitstream's high quality reference and the output bitstream's high quality reference, i.e. $E_{i-1}^1 - E_{i-1}^2$ in equation (4). Architecture 400 includes both encoder and decoder aspects. For instance, the encoder and decoder share MC 428 and BUF 426. Whereas, DCT 430 pertains to the decoding component, and IDCT 424 pertains the decoder.

As shown in FIG. 4, the inputs of the transcoder 222 are one base layer's bitstream 402 and a corresponding enhancement layer's bitstream 404, which in combination comprise at least a portion of FGS video 212. The only operation in the base layer is to extract the motion vectors (MVs) 406 to transcode the enhancement layer bitstream. In this implementation, the MV s are extracted by bitstream parse and variable length decoding. VLD decoding to extract the MVs is not the same as decoding the base layer input 402 because coded coefficients and other information at the base layer can be simply skipped with low complexity. As for the enhancement layer bitstream 404, it is first processed by variable length decoding 408 and bit-plane decoding 410 and 412 to extract two (2) groups of DCT coefficients from the enhancement layer input, one is for the high quality reference, i.e. DCT coefficients of $e_i^1$ (shown by the path with $HQRB_1$), and the other is for the high quality video decoded to be transcoded, i.e. DCT coefficients of $e_1$. At this point, the DCT coefficients of the difference images between $E_i^1$ and $E_i^2$ are added to generate the final coefficient for output. The coefficients are coded by bit-plane coding 416 and variable length coding 418 to produce the new enhancement layer bitstream 420—which represents at least a portion of the transcoded FGS video 212 of FIG. 2.

Referring to FIG. 4, $(E_i^1 - E_i^2)$ are updated (see, equation no. 5) by loop 422 comprising, in one implementation, IDCT module 424, frame buffer (BUF) 426, MC module 428, DCT module 430, and bit-plane (BP) coding module 416. This loop maintains the difference signals between the input bitstream's high quality reference and the output bitstream's high quality reference, i.e. $E_{i-1}^1 - E_{i-1}^2$, of equation (4). $(E_i^1 - E_i^2)$ updating is performed in the DCT domain. In one implementation, architecture 400 is further simplified by implementing operations of MC module 428 in the DCT domain, which reduces components by one DCT module and an IDCT module.

Enhancement layer bitstream transcoding architecture 400 avoids complex computations in the base layer. Furthermore, the memory footprint of the enhancement layer encoder is substantially small. There is just one frame buffer in the transcoder. But for the re-encoding case, at least four frame buffers are maintained for decoder's base layer and enhancement layer and encoder's base layer and enhancement layer respectively. The transcoder can change each macro-block's coding mode of the output bitstream to assist the error resilience or to reduce the drifting error. These aspects allow the enhancement layer transcoding module 222 to adjust a scalable bitstream's best working range by adjusting the streaming bitstream as a function of changes in network bit-rates/bandwidth.

An Exemplary Procedure

Figure 5:
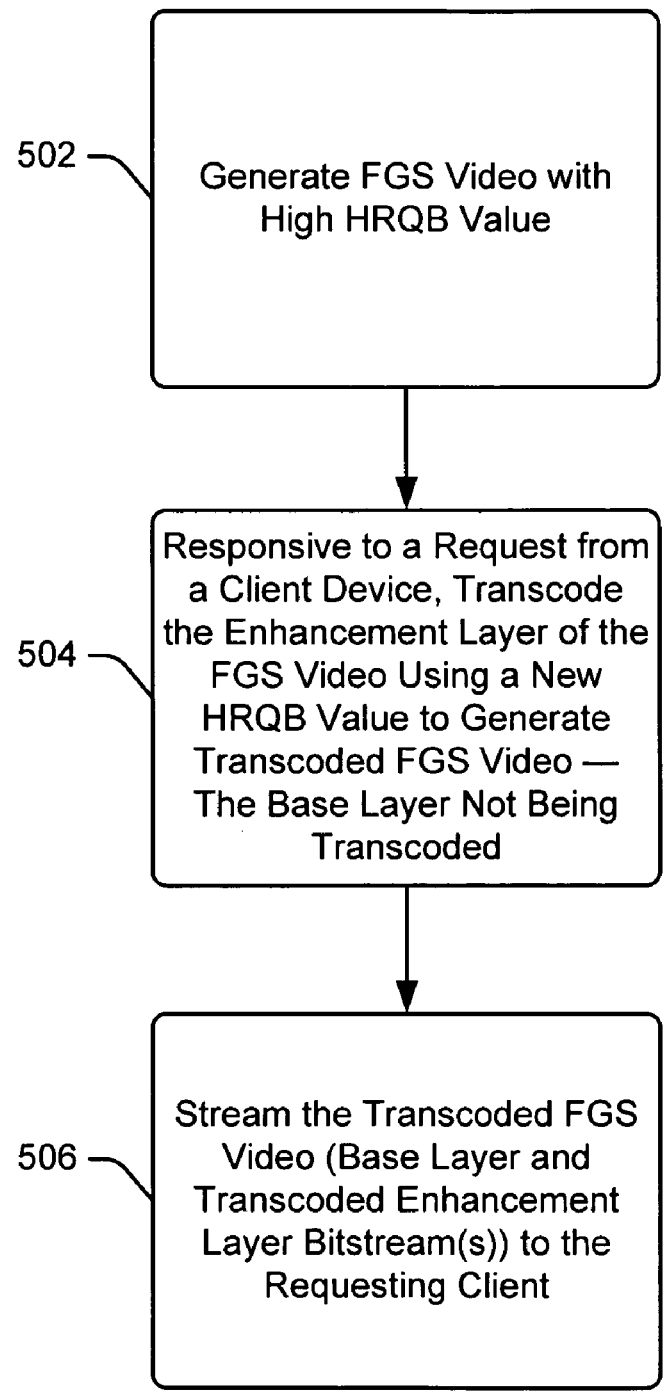
FIG. 5 shows an exemplary procedure for enhancement layer transcoding to improve scalable video streaming performance.

FIG. 5 shows an exemplary procedure 500 for enhancement layer transcoding to improve scalable video streaming performance. (In the following discussion, the left-most digit of a component reference number identifies the particular figure in which the component first appears). At block 502, the procedure generates or otherwise obtains FGS video 212. The FGS video has been encoded with a high HRQB value. At block 504, the procedure transcodes enhancement layer bitstreams of the FGS video using a new HRQB value that is based on current network communication data throughput and/or networking and/or video presentation capabilities of a requesting client device 208. The operation of block 504 generates transcoded FGS video 204. At block 506, the procedure streams the transcoded FGS video to the requesting client device.

An Exemplary Suitable Computing Environment

Figure 6:
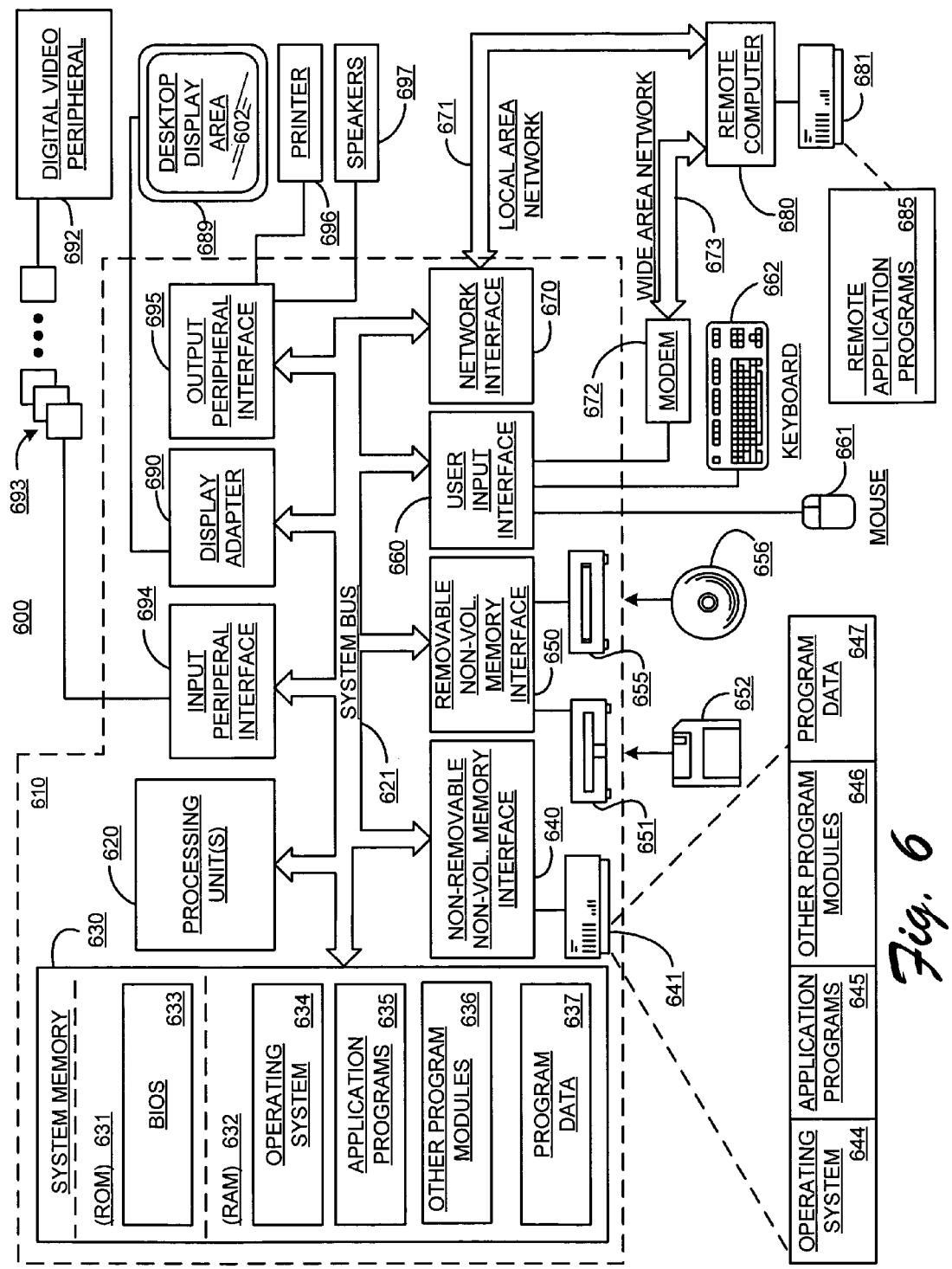
FIG. 6 illustrates an example of a suitable computing environment on which a content provider framework for enhancement layer transcoding of FGS video may be fully or partially implemented.

FIG. 6 illustrates an example of a suitable computing environment 600 on which a content provider framework for enhancement layer transcoding of Fine-Grained-Scalable (FGS) Video may be fully or partially implemented. Exemplary computing environment 600 is only one example of a suitable computing environment and is not intended to suggest any limitation as to the scope of use or functionality of systems and methods the described herein. Neither should computing environment 600 be interpreted as having any dependency or requirement relating to any one or combination of components illustrated in computing environment 600.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for enhancement layer transcoding of FGS video includes a general purpose computing device in the form of a computer 610. The computer 610 is an exemplary implementation of the content distribution server 214 of FIG. 2 to produce and/or distribute video over a network to a client. Components of computer 610 may include, but are not limited to, one or more processing units 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. System memory 630 includes computer storage media in the form of volatile and/or nonvolatile memory such as read only memory (ROM) 631 and random access memory (RAM) 632.

A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637. Application programs 635 represent, for example, one or more of the enhancement layer transcoding module 222 of FIG. 2, and optionally, the video encoding module 220. Program data includes, for example, transcoded FGS video 204, FGS video 212, video files 216, new HRQB 228, and other data (see, other data 240 of FIG. 2) such as intermediate coefficients and other data values determined and utilized to transcode the enhancement layer of the FGS video to generate the transcoded FGS video.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system (OS) 644, application programs 645, other program modules 646, and program data 647 are given different numbers here to illustrate that they are at least different copies. In this implementation, the OS is a multitasking operating system.

A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB).

A display monitor 689 or other type of display device for video display is also connected to the system bus 621 via display adapter 690. In addition to the monitor, computers may also include other peripheral output devices such as speakers 697 and printer 696, which may be connected through an output peripheral interface 695. A video peripheral 692 such as a video camera, DVD player, and/or the like, capable of transferring video frames 693 may also be included as an input device to the computing device 610. Video data 693 from the one or more video peripherals 692 are input into the computer 610 via an appropriate data input peripheral interface 694. Video data 693 is representative of one embodiment of video data 216 of FIG. 2. Interface 694 is connected to the system bus 621, thereby allowing video data 693 to be routed to and stored in the RAM 632, or one of the other data storage devices associated with the computer 610. Besides and/or in combination with the video input peripheral 692, video data 693 can be input into the computer 610 from any of the aforementioned computer-readable media.

The computer 610 may operate in a networked environment using logical connections to one or more remote computers, such as a remote computer 680. The remote computer 680 of this example represents one implementation of the client device 208 of FIG. 2. The remote computer 680 may be a personal computer, a server, a router, a handheld device such as a handheld PC, a network PC, a peer device or other common network node, and typically includes many or all of the elements described above relative to the computer 610, although only a memory storage device 681 has been illustrated in FIG. 6.

The logical connections depicted in FIG. 6 include a local area network (LAN) 671 and a wide area network (WAN) 673, but may also include other networks of various implementation such as one or more wireless communication networks. Such networking environments are commonplace in homes, offices, enterprise-wide computer networks, intranets and the Internet. When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism.

In a networked environment, program modules depicted relative to the computer 610, or portions thereof, may be stored in the remote memory storage device. By way of example, and not limitation, FIG. 6 illustrates remote application programs 685 as residing on memory device 681. The network connections shown are exemplary and other means of establishing a communications link between the computers may be used.

References

[1] H.-C. Huang, C.-N. Wang, T. Hao, "A robust fine granularity scalability using trellis-based predictive leak," IEEE Trans. on CSVT, June 2002.

[2] W.-H. Peng and Y.-K. Chen, "Mode-Adaptive Fine Granularity Scalability," in Proc. of IEEE ICIP, vol. 2, pp. 993-996, October 2001.

[3] Y. He, F. Wu, S. Li, Y, Zhong, S. Yang, "H.26L-based fine granularity scalable video coding," ISCAS 2002, Scottsdale, Ariz., May 26-29, 2002.

Conclusion

The described systems and methods for enhancement layer transcoding of FGS video have been described in language specific to structural features and methodological operations. Rather, the specific features and operations are disclosed as exemplary forms of implementing the claimed subject matter.

The invention claimed is:

1. A method implemented in a content distribution server, the method comprising:
  obtaining a bitstream of encoded video data, the encoded video data including an encoded base layer and one or more encoded enhancement layers, the video data having been encoded according to a high HQRB (high quality reference bit-rate) that determines how many bits of an enhancement layer bitstream are used to reconstruct a high quality reference image;
  decoding the enhancement layer bitstream from the bitstream of encoded video using the content distribution server;
  extracting motion vectors from the encoded base layer and skipping coded coefficients and other information at the encoded base layer to transcode the enhancement layer bitstream;
  determining data throughput characteristics of a content distribution network coupled to a client computing device using the content distribution server;
  calculating a new HQRB based at least on a difference between the data throughput characteristics of the network and a bit rate of the encoded base layer in the bitstream of encoded video data using the content distribution server;
  encoding the decoded enhancement layer bitstream based at least on the new HQRB to generate a transcoded enhancement layer bitstream using the content distribution server; and
  streaming the transcoded enhancement layer bitstream to the client computing device using the content distribution server with the encoded base layer bitstream with encoding that is at least partially optimized for the throughput characteristics of the content distribution network.

2. The method of claim 1, wherein the encoding substantially optimizes transcoded enhancement layer for streaming with the base layer across the network to the client computing device as compared to streaming of the encoded video data.

3. The method of claim 1, wherein the encoded video data is encoded using progressive fine-granularity scalable (PFGS), MA-FGS, or RFGS encoding criteria.

4. The method of claim 1, further comprising determining when the data throughput characteristics indicate a relatively low data throughput, and wherein calculating the new HRQB comprises:
  encoding the decoded enhancement layer bitstream with the new HRQB having a bit rate lower than the high HRQB in response to the determining of a relatively low data throughput.

5. The method of claim 1, further comprising determining when the data throughput characteristics indicate a relatively high data throughput, and wherein calculating the new HRQB comprises:
  encoding the decoded enhancement layer bitstream with the new HRQB having a bit rate the same or higher than the high HRQB in response to the determining of a relatively high data throughput.

6. The method of claim 1, wherein the encoding further comprises:
  determining the motion vectors extracted from the encoded base layer without decoding the bitstream of the encoded base layer.

7. The method of claim 1, wherein the method further comprises streaming the transcoded enhancement layer and the encoded base layer across the network to the client computing device.

8. The method of claim 1, wherein the method further comprises encoding video data to generate the one or more enhancement layers and the encoded base layer.

9. The method of claim 1, wherein the method further comprises determining networking and/or video presentation capabilities of the client computing device, and wherein calculating the new HQRB further comprises formulating the new HQRB based at least on one or more of the networking and/or video presentation capabilities.

10. A computer-readable memory storage device encoded with computer-executable instructions that, when executed by a processor in a content distribution server, implement operations comprising:
  (a) producing a bitstream of encoded video data, the encoded video data including an encoded base layer and one or more encoded enhancement layers, the video data having been encoded according to a high level high quality reference bit-rate (HQRB) that determines how many bits of the enhancement layer bitstream are used to reconstruct a high quality reference;
  (b) decoding the enhancement layer bitstream from the bitstream of encoded video data, using the processor;
  (c) extracting motion vectors from encoded the base layer while keeping the bitstream of the encoded base layer unchanged and skipping coded coefficients and other information at the encoded base layer to transcode the enhancement layer bitstream;
  (d) determining data throughput characteristics of a content distribution network coupled to a client computing device and changes to the data throughput characteristics of the content distribution network using the processor;

(e) calculating a new HQRB based at least on the data throughput characteristics of the content distribution network and a bit rate of the encoded base layer in the bitstream of encoded video data using the processor, wherein the new, calculated HQRB is about equal to or less than the bandwidth used to deliver the unmodified, encoded, base layer; and (f) encoding the decoded enhancement layer bitstream based at least on the new HQRB to generate a transcoded enhancement layer bitstream using the processor;

(g) streaming the transcoded enhancement layer bitstream to the client computing device using the content distribution server with the encoded base layer bitstream; and (h) repeating (c)-(g) in response to changes in the data throughput characteristics of the network.

11. The computer-readable memory storage medium of claim 10, wherein the computer-executable instructions for encoding substantially optimize transcoded enhancement layer for streaming with the encoded base layer across the network to the client computing device.

12. The computer-readable memory storage medium of claim 10, wherein the encoded video data is encoded using progressive fine-granularity scalable (PFGS), MA-FGS, or RFGS encoding criteria.

13. The computer-readable memory storage medium of claim 10, wherein operations for calculating comprise operations, responsive to identifying a relatively low data throughput, for selecting the new HRQB to be lower than the high HRQB.

14. The computer-readable memory storage medium of claim 10, wherein operations for calculating the new HRQB comprise operations, for selecting the new HRQB to be the same or higher than the high HRQB in response to identifying a relatively high data throughput.

15. The computer-readable memory storage medium of claim 10, wherein the operations further comprise operations for streaming the transcoded enhancement layer and the encoded base layer across the network to the client computing device.

16. The computer-readable memory storage medium of claim 10, wherein the operations further comprise operations for encoding video data to generate the one or more enhancement layers and the encoded base layer.

17. The computer-readable memory storage medium of claim 10, wherein the operations further comprising operations for determining networking and/or video presentation capabilities of the client computing device, and wherein calculating the new HQRB further comprises formulating the new HQRB based at least on one or more of the networking and/or video presentation capabilities.

18. The computer-readable memory storage medium of claim 10, wherein the decoding of the enhancement layer bitstream, comprises processing by variable length decoding and bit-plane decoding to extract at least two groups of coefficients, the at least two groups of coefficients comprising:
a first of the at least two groups of coefficients being for the high quality reference; and
a second of the at least two groups of coefficients being for the high quality video decoded to be transcoded.

19. A computing device of a content distribution server comprising:
a memory;
a processor coupled to the memory, the memory being encoded with computer-program instructions executable by the processor to implement operations comprising:

decoding an enhancement layer bitstream from a bitstream of encoded video data using the processor, the encoded video data including one or more enhancement layers, the video data having been encoded according to a high HQRB (high quality reference bit-rate) that determines how many bits of the enhancement layer bitstream are used to reconstruct a high quality image;

extracting motion vectors from an encoded base layer of the encoded video data and skipping coded coefficients and other information at the encoded base layer to transcode the enhancement layer bitstream;

determining data throughput characteristics of a content distribution network coupled to a client computing device using the processor;

calculating a new HQRB based at least on a difference between the data throughput characteristics of the content distribution network and a bit rate of the encoded base layer in the bitstream of encoded video data using the processor;

encoding the decoded enhancement layer bitstream based at least on the new HQRB to generate a transcoded enhancement layer bitstream using the processor;

streaming the transcoded enhancement layer bitstream to the client computing device; and wherein the encoded base layer remains encoded for streaming to the client computing device and wherein the encoding is at least partially optimized for the data throughput characteristics of the content distribution network.

20. The computing device of claim 19, wherein the computer-executable instructions for encoding substantially optimizes transcoded enhancement layer for streaming with the encoded base layer across the network to the client computing device as compared to streaming of the encoded video data.

21. The computing device of claim 19, wherein the encoded video data is encoded using progressive fine-granularity scalable (PFGS), MA-FGS, or RFGS encoding criteria.

22. The computing device of claim 19, wherein the data throughput characteristics indicate a relatively low data throughput, and wherein the operations for calculating the new HRQB further comprise operations, responsive to identifying the relatively low data throughput, for selecting the new HRQB to be lower than the high HRQB.

23. The computing device of claim 19, wherein the operations for calculating the new HRQB further comprise operations, responsive to identifying a relatively high data throughput, for selecting the new HRQB to be the same or higher than the high HRQB.

24. The computing device of claim 19, wherein the operations further comprise operations for streaming the transcoded enhancement layer and the encoded base layer across the network to the client computing device.

25. The computing device of claim 19, wherein the operations further comprise operations for encoding video data to generate the one or more enhancement layers and the encoded base layer.

26. The computing device of claim 19, wherein the operations further comprise operations for determining networking and/or video presentation capabilities of the client computing device, and wherein calculating the new HQRB further comprises formulating the new HQRB based at least on one or more of the networking and/or video presentation capabilities.

27. The computing device as recited in claim 19, wherein the operations further comprise:
maintaining a difference between the enhancement layer encoded according to the high HQRB and the enhancement layer bitstream based at least on the new HQRB, the maintaining operation performed by components comprising:
  an inverse discrete cosine transform (IDCT) module;
  a frame buffer;
  a motion compensation (MC) module;
  a discrete cosine transform (DCT) module; and
  a bit-plane coding module.

28. A computer-readable memory storage device encoded with processing means in a computer-readable storage medium, the processing means comprising:
  means for obtaining an encoded video data having an encoded base layer and one or more encoded enhancement layers, the video data having been encoded according to a high level high quality reference bit-rate (HQRB) that determines how many bits of the enhancement layer bitstream are used to reconstruct a high quality reference image;
  means for decoding the enhancement layer bitstream from the encoded video data, using the encoded base layer bitstream without decoding the encoded base layer bitstream ;
  means for extracting motion vectors from the encoded base layer and skipping coded coefficients and other information at the base layer to transcode the enhancement layer bitstream;
  means for determining data throughput characteristics of a content distribution network coupled to a client computing device;
  means for calculating a new HQRB based at least on a difference between the data throughput characteristics of the content distribution network and a bit rate of the encoded base layer in the bitstream of encoded video data;
  means for encoding the decoded enhancement layer bitstream based at least on the new HQRB to generate a transcoded enhancement layer bitstream;
  means for maintaining a difference between the enhancement layer encoded according to the high level HQRB and the enhancement layer bitstream based at least on the new HQRB; and
  means for streaming the transcoded enhancement layer bitstream to the client computing device with the encoded base layer bitstream wherein the encoding is at least partially optimized for the data throughput characteristics of the content distribution network.

29. The computer-readable memory storage device of claim 28, wherein the means for encoding substantially optimizes transcoded enhancement layer for streaming with the encoded base layer across the network to the client computing device as compared to streaming of the encoded video data.

30. The computer-readable memory storage device of claim 28, wherein the encoded video data is encoded using progressive fine-granularity scalable (PFGS), MA-FGS, or RFGS encoding criteria.

31. The computer-readable memory storage device of claim 28, wherein the means for calculating the new HRQB further comprise, responsive to identifying a relatively low data throughput, means for selecting the new HRQB to be lower than the high HRQB.

32. The computer-readable memory storage device of claim 28, wherein the means for calculating the new HRQB further comprise means for selecting the new HRQB to be the same or higher than the high HRQB in response to identifying a relatively high data network throughput.

33. The computer-readable memory storage device of claim 28, wherein the processing means comprise means for encoding video data to generate the one or more enhancement layers and the encoded base layer.

34. The computer-readable memory storage device of claim 28, wherein the processing means further comprise means for streaming the transcoded enhancement layer and the encoded base layer across the network to the client computing device.

35. The computer-readable memory storage device of claim 28, wherein the processing means further comprise means for determining networking and/or video presentation capabilities of the client computing device, and wherein the means for calculating the new HQRB further comprises means for formulating the new HQRB based at least on one or more of the networking and/or video presentation capabilities.

36. The computing device as recited in claim 28, wherein the means for maintaining the difference between the enhancement layer encoded according to the high level HQRB and the enhancement layer bitstream based at least on the new HQRB comprise:
  a means for performing inverse discrete cosine transform (IDCT);
  a means for buffering frames;
  a means for performing motion compensation (MC);
  a means for performing discrete cosine transform (DCT); and
  a means for performing bit-plane coding module.

* * * * *